(12) United States Patent
Duffy et al.

(10) Patent No.: US 6,390,082 B1
(45) Date of Patent: May 21, 2002

(54) METHOD AND APPARATUS FOR CONTROLLING THE CURRENT LEVEL OF A FUEL INJECTOR SIGNAL DURING SUDDEN ACCELERATION

(75) Inventors: Kevin P. Duffy, East Peoria; Gregory G. Hafner, Normal; Brian G. McGee, Chillicothe; Matthew R. Roth, Metamora, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/616,002

(22) Filed: Jul. 13, 2000

(51) Int. Cl.[7] .......................... F02D 41/10; F02D 41/14
(52) U.S. Cl. .................. 123/682; 123/490; 123/492
(58) Field of Search ............................... 123/357, 446, 123/447, 492, 494, 682, 490; 361/154

(56) References Cited

U.S. PATENT DOCUMENTS

| | | | |
|---|---|---|---|
| 4,191,137 A | * 3/1980 | Williams et al. | 123/492 |
| 4,520,784 A | * 6/1985 | Isobe et al. | 123/492 |
| 4,571,683 A | 2/1986 | Kobayashi et al. | |
| 4,576,135 A | 3/1986 | Johnson | |
| 4,586,479 A | * 5/1986 | Isomura et al. | 123/492 |
| 4,621,599 A | 11/1986 | Igashira et al. | |
| 4,700,681 A | * 10/1987 | Hanafusa et al. | 123/478 |
| 4,704,999 A | 11/1987 | Hashikawa et al. | |
| 4,718,390 A | * 1/1988 | Gonda et al. | 123/357 X |
| 4,729,056 A | 3/1988 | Edwards et al. | |
| 4,836,161 A | 6/1989 | Abthoff et al. | |
| 4,922,878 A | 5/1990 | Shinogle et al. | |
| 5,020,979 A | 6/1991 | Askew | |
| 5,070,836 A | 12/1991 | Wahl et al. | |
| 5,113,833 A | 5/1992 | Nagano et al. | |
| 5,137,000 A | * 8/1992 | Stepper et al. | 123/478 |
| 5,176,120 A | * 1/1993 | Takahashi | 123/446 X |
| 5,245,972 A | 9/1993 | Denz et al. | |

(List continued on next page.)

FOREIGN PATENT DOCUMENTS

EP   0 221 832 A2   5/1987

OTHER PUBLICATIONS

SAE 2/24–27, 1997 A New Concept for Low Emission Diesel Combusion—Printed from Diesel Engine Combustion Processes and Emission Control Technolgies (SP–1246).

*Primary Examiner*—Tony M. Argenbright (57) ABSTRACT

An apparatus and method for controlling fuel injection signals to an engine during a sudden acceleration event. The present apparatus and method includes an electronic controller coupled to the electronically controlled fuel injectors of the engine and operable to recognize a sudden acceleration condition based upon certain sensed conditions associated with the acceleration of the engine. The controller is further operable to increase the pull-in current level and/or the hold-in current level of the fuel injection signals to improve fuel injector performance, fuel consumption, and emissions when a sudden acceleration event is recognized. Shortening the duration of the fuel shots associated with the fuel injection signal helps offset additional electrical power requirements associated with the higher current levels.

23 Claims, 5 Drawing Sheets

U.S. PATENT DOCUMENTS

| | | |
|---|---|---|
| 5,267,545 A | 12/1993 | Kitson |
| 5,268,842 A | 12/1993 | Martson et al. |
| 5,277,164 A | 1/1994 | Takahashi et al. |
| 5,320,079 A | 6/1994 | Kuwabara |
| 5,379,733 A | 1/1995 | Haddick et al. |
| 5,427,072 A | 6/1995 | Udo |
| 5,427,083 A | 6/1995 | Ahern |
| 5,450,829 A | 9/1995 | Beck |
| 5,460,128 A | 10/1995 | Kruse |
| 5,492,098 A | 2/1996 | Hafner et al. |
| 5,499,608 A | 3/1996 | Meister et al. |
| 5,507,260 A | 4/1996 | Hintzen |
| 5,540,205 A | 7/1996 | Davis et al. |
| 5,549,092 A | 8/1996 | Hasegawa et al. |
| 5,564,391 A * | 10/1996 | Barnes et al. ............... 123/446 |
| 5,566,650 A | 10/1996 | Kruse |
| 5,566,660 A | 10/1996 | Camplin et al. |
| 5,588,415 A | 12/1996 | Ahern |
| 5,609,131 A | 3/1997 | Gray, Jr. et al. |
| 5,634,448 A | 6/1997 | Shinogle et al. |
| 5,647,317 A | 7/1997 | Weisman, II et al. |
| 5,678,521 A | 10/1997 | Thompson et al. |
| 5,685,273 A | 11/1997 | Johnson et al. |
| 5,701,870 A | 12/1997 | Gottshall et al. |
| 5,704,336 A | 1/1998 | Wrobel |
| 5,722,373 A | 3/1998 | Paul et al. |
| 5,732,680 A | 3/1998 | Ninomiya et al. |
| 5,740,775 A | 4/1998 | Suzuki et al. |
| 5,740,776 A | 4/1998 | Enderle et al. |
| 5,746,183 A | 5/1998 | Parke et al. |
| 5,778,850 A | 7/1998 | Buratti et al. |
| 5,794,585 A | 8/1998 | Yonezawa et al. |
| 5,803,049 A | 9/1998 | Harcombe |
| 5,832,901 A | 11/1998 | Yoshida et al. |
| 5,839,275 A | 11/1998 | Hirota et al. |
| 5,865,153 A | 2/1999 | Matsumoto |
| 5,865,158 A | 2/1999 | Cleveland et al. |
| 5,893,347 A | 4/1999 | McGee et al. |
| 5,979,398 A | 11/1999 | Yanagihara |
| 5,979,412 A | 11/1999 | Werner |
| 5,986,871 A | 11/1999 | Forck et al. |
| 6,000,384 A | 12/1999 | Brown et al. |
| 6,006,727 A | 12/1999 | Katashiba et al. |
| 6,009,849 A | 1/2000 | Yamanoto et al. |
| 6,014,956 A | 1/2000 | Cowden et al. |
| 6,021,370 A | 2/2000 | Bellinger et al. |
| 6,026,780 A | 2/2000 | Barnes et al. |
| 6,032,642 A | 3/2000 | Trumbower et al. |
| 6,044,824 A | 4/2000 | Mamiya et al. |

* cited by examiner

Fig. 1.

METHOD AND APPARATUS FOR CONTROLLING THE CURRENT LEVEL OF A FUEL INJECTOR SIGNAL DURING SUDDEN ACCELERATION

TECHNICAL FIELD

This invention relates generally to electronically controlled fuel injected engines and, more particularly, to a control system for controlling the current levels of a fuel injection signal based upon a sudden engine acceleration condition.

BACKGROUND ART

Electronically controlled fuel injectors are well known in the art including both hydraulically actuated electronically controlled fuel injectors as well as mechanically actuated electronically controlled fuel injectors. Electronically controlled fuel injectors typically inject fuel into a specific engine cylinder as a function of a fuel injection signal received from an electronic controller. These signals include waveforms that are indicative of a desired fuel injection rate as well as the desired timing and quantity of fuel to be injected into the cylinders of the engine. Each injection waveform may consist of a plurality of distinct and/or rate shaped fuel shots delivered to a cylinder during a particular fuel injection event. As used throughout this disclosure, an injection event is defined as the injections that occur in a cylinder during one cycle of the engine. For example, one cycle of a four cycle engine for a particular cylinder, includes an intake, compression, expansion, and exhaust stroke. Therefore, the injection event in a four stroke engine includes the number of injections, or shots, that occur in a cylinder during the four strokes of the piston. The term shot as used in the art may also refer to the actual fuel injection or to the command current signal to a fuel injector or other fuel actuation device indicative of an injection or delivery of fuel to the engine.

As is known in the art, to precisely control the power and emissions output of an internal combustion engine, it is necessary to control the timing and quantity of fuel injected into the engine's cylinders. Electronically controlled fuel injectors typically inject fuel into a specific engine cylinder as a function of an injection signal received from an electronic controller. When using hydraulically actuated electronically controlled unit injectors, the injection signal includes generally a two-tier current waveform that includes a pull-in current level and a generally lower hold-in current level. The higher pull-in current is used to quickly open the fuel injector and thereby decrease the response time, that is, the time between the initiation of a fuel injection signal and the time at which fuel actually begins to enter the engine cylinder. Once fuel injection has commenced, a lower level hold-in current can be used to hold the injector open for the remainder of the injection event.

The performance of such fuel injectors during peak or sudden engine acceleration may be inconsistent due to high injector demands during such acceleration periods and the slow response time of the injector. For example, in a hydraulically operated fuel injector system, the rail pressure will increase during an acceleration event because the controller requests such an increase. During a sudden engine acceleration, the normal pull-in current level for the injector and the duration thereof may be inadequate for quickly opening the fuel injector to deliver the increased required amount of fuel to the cylinders in the appropriate period of time to achieve the requested acceleration. This is true because the response of the fuel injector can be slower due to the increased rail pressure requested during the acceleration condition. As a result, during sudden engine acceleration conditions, it is difficult to accurately control and deliver the proper amount of fuel to the fuel injectors during the appropriate period of time. Consequently, the injection events will usually not be consistent and could inconsistently fuel the engine. This results in erratic engine operation during engine acceleration and/or the engine operation does not successfully match the desired injection event.

It is therefore desirable to improve the responsiveness and performance of fuel injectors during sudden engine acceleration events. In general, a higher pull-in current level will decrease the response time of the injector. Increasing the pull-in current to accommodate sudden engine acceleration will therefore decrease the response time of the injector. However, current levels that are too high for too long may result in undesirable consequences such as thermal damage to the electronic circuitry associated with the generation of the fuel injection signals. In addition, when the pull-in current level is held too high for too long, the fuel injector solenoid or other electrical activating device must be able to withstand the higher electrical power levels and the driver circuit electrical components must be able to provide and tolerate the greater heat. Higher current levels for too long of a duration can also create undue stress on the mechanical components of a fuel injector and possibly degrade its repeatability, whereas reengineering the entire system to provide electronic components capable of handling higher electrical power and/or more robust mechanical components will increase the cost of the overall injector control system.

Typically, the level and duration of the pull-in current and the hold-in current are preselected values that provide such currents for a sufficient length of time to facilitate an acceptable fuel injector response under normal engine speed operating conditions. However, these preselected current levels may not be adequate to provide the desired response under sudden engine speed acceleration conditions.

It is known to provide a boost circuit, such as disclosed in the patent U.S. Pat. No. 5,678,521, or other additional circuitry to generate higher voltage levels to facilitate increased electrical current levels to the fuel injection devices during an acceleration event to expedite the opening of the associated fuel injection devices. However, there are a number of drawbacks associated with such a hardware implementation. These drawbacks include additional circuitry required to step up the battery voltage, additional electrical hardware components which increase the overall cost of the electronics, increased physical space required for the additional hardware, a higher hardware failure rate due to the higher temperatures and increased power levels associated therewith, and the increased size of the electronic control module housing this hardware makes engine mounting applications more challenging. Other disadvantages also exist.

Accordingly, the present invention is directed to overcoming one or more of the problems as set forth above.

DISCLOSURE OF THE INVENTION

In one aspect of the present invention, fuel injection signals are controlled based upon sensing a sudden engine acceleration condition. An electronic controller is coupled to appropriate sensors or other signal producing mechanisms for receiving at least one signal indicative of a condition associated with sudden acceleration of the engine. The sensing of a sudden acceleration condition may be achieved by any one of, or a combination of, various ways or values associated with the operation or performance of the engine such as by sensing a change in engine speed or sensing air intake boost pressure or other parameters. When a sudden acceleration condition is determined or recognized, the controller is operative to output a signal to modify the fuel injection signal to appropriately adjust at least one of the pull-in current level, pull-in current duration, and the hold-in current level, to accommodate and meet the desired acceleration injection requirements. The modified fuel injection signal results in improved responsiveness of the fuel injectors during sudden acceleration periods or events. The present method and apparatus is capable of varying the pull-in current level, pull-in current duration, and hold-in current levels as the fuel injector operating conditions transition between normal engine operation and a sudden engine acceleration.

BRIEF DESCRIPTION OF THE DRAWINGS

For a better understanding of the present invention, reference may be made to the accompanying drawings in which.

BEST MODE FOR CARRYING OUT THE INVENTION

Figure 1:
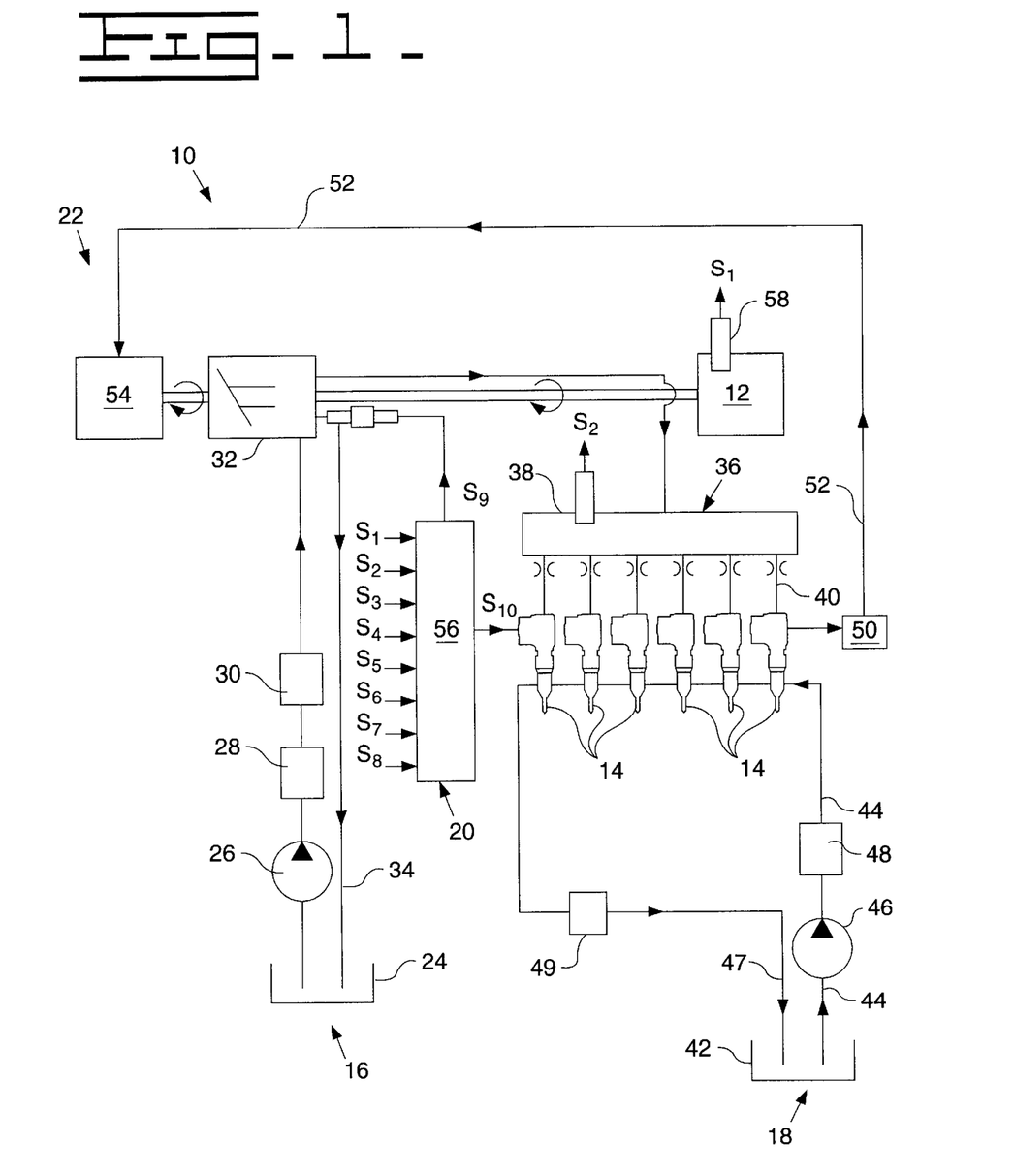
FIG. 1 is a schematic view of an electronically controlled fuel injector system usable in one embodiment of the present invention.

Referring to FIG. 1, there is shown one embodiment of a hydraulically actuated electronically controlled fuel injection system 10 in an exemplary configuration as adapted for a direct-injection compression ignition engine 12. Fuel system 10 includes one or more electronically controlled fuel injectors 14 which are adapted to be positioned in a respective cylinder head bore of the engine 12. While the embodiment of FIG. 1 applies to an in-line six cylinder engine, it is recognized and anticipated, and it is to be understood, that the present invention is also equally applicable to other types of engines such as V-type engines and rotary engines, and that the engine may contain any plurality of cylinders or combustion chambers. In addition, while the embodiment of FIG. 1 illustrates one embodiment of a hydraulically actuated electronically controlled fuel injector system, it is likewise recognized and anticipated that the present invention is also equally applicable to other types of electronically controlled injector units.

The fuel system 10 of FIG. 1 includes an apparatus or means 16 for supplying actuation fluid to each injector 14, an apparatus or means 18 for supplying fuel to each injector, electronic control means 20 for controlling the fuel injection system including the manner and frequency in which fuel is injected by the injectors 14 including timing, number of injections per injection event, fuel quantity per injection, time delay between each injection, and the injection profile. The system may also include apparatus or means 22 for recirculating fluid and/or recovering hydraulic energy from the actuation fluid leaving each injector 14.

The actuating fluid supply means 16 preferably includes an actuating fluid sump or reservoir 24, a relatively low pressure actuating fluid transfer pump 26, an actuating fluid cooler 28, one or more actuation fluid filters 30, a high pressure pump 32 for generating relatively high pressure in the actuation fluid, and at least one relatively high pressure actuation fluid manifold or rail 36. A common rail passage 38 is arranged in fluid communication with the outlet from the relatively high pressure actuation fluid pump 32. A rail branch passage 40 connects the actuation fluid inlet of each injector 14 to the high pressure common rail passage 38.

Apparatus 22 may include a waste accumulating fluid control valve 50 for each injector, a common recirculation line 52, and a hydraulic motor 54 connected between the actuating fluid pump 32 and recirculation line 52. Actuation fluid leaving an actuation fluid drain of each injector 14 would enter the recirculation line 52 that carries such fluid to the hydraulic energy recirculating or recovering means 22. A portion of the recirculated actuation fluid is channeled to high pressure actuation fluid pump 32 and another portion is returned to actuation fluid sump 24 via recirculation line 34.

In a preferred embodiment, the actuation fluid is engine lubricating oil and the actuating fluid sump 24 is an engine lubrication oil sump. This allows the fuel injection system to be connected as a parasitic subsystem to the engine's lubricating oil circulation system. Alternatively, the actuating fluid could be fuel or some other type of fluid.

The fuel supply means 18 preferably includes a fuel tank 42, a fuel supply passage 44 arranged in fluid communication between the fuel tank 42 and the fuel inlet of each injector 14, a relatively low pressure fuel transfer pump 46, one or more fuel filters 48, a fuel supply regulating valve 49, and a fuel circulation and return passage 47 arranged in fluid communication between each injector 14 and fuel tank 42.

Electronic control means 20 preferably includes an electronic control module (ECM) 56, also referred to as a controller, the use of which is well known in the art. ECM 56 typically includes processing means such as a microcontroller or microprocessor, a governor such as a proportional integral derivative (PID) controller for regulating engine speed, and circuitry including input/output circuitry, power supply circuitry, signal conditioning circuitry, solenoid driver circuitry, analog circuits and/or programmed logic arrays as well as associated memory. The memory is connected to the microcontroller or microprocessor and stores instruction sets, maps, lookup tables, variables, and more. ECM 56 may be used to control many aspects of fuel injection including (1) the fuel injection timing, (2) the total fuel injection quantity during an injection event, (3) the fuel injection pressure, (4) the number of separate injections or fuel shots during each injection event, (5) the time intervals between the separate injections or fuel shots, (6) the time duration of each injection or fuel shot, (7) the fuel quantity associated with each injection or fuel shot, (8) the actuation fluid pressure, (9) electrical current level of the injector waveform, and (10) any combination of the above parameters. Each of such parameters are variably controllable independent of engine speed and load. ECM 56 receives a plurality of inputs from signal providing mechanisms, such as sensor input signals $S_1$–$S_8$ which correspond to known sensor inputs such as engine operating conditions including engine speed, engine temperature, pressure of the actuation fluid, cylinder piston position and so forth that are used to determine the precise combination of injection parameters for a subsequent injection event.

For example, an engine temperature sensor 58 is illustrated in FIG. 1 connected to engine 12. In one embodiment, the engine temperature sensor includes an engine oil temperature sensor. However, an engine coolant temperature sensor can also be used to detect the engine temperature. The engine temperature sensor 58 produces a signal designated by $S_1$ in FIG. 1 and is inputted to ECM 56 over line $S_1$. In the particular example illustrated in FIG. 1, ECM 56 issues control signal $S_9$ to control the actuation fluid pressure from pump 32 and a fuel injection signal $S_{10}$ to energize a solenoid or other electrical actuating device within each fuel injector thereby controlling fuel control valves within each injector 14 and causing fuel to be injected into each corresponding engine cylinder. Each of the injection parameters are variably controllable, independent of engine speed and load. In the case of the fuel injectors 14, control signal $S_{10}$ is a fuel injection signal that is an ECM commanded current to the injector solenoid or other electrical actuator.

Figure 2:
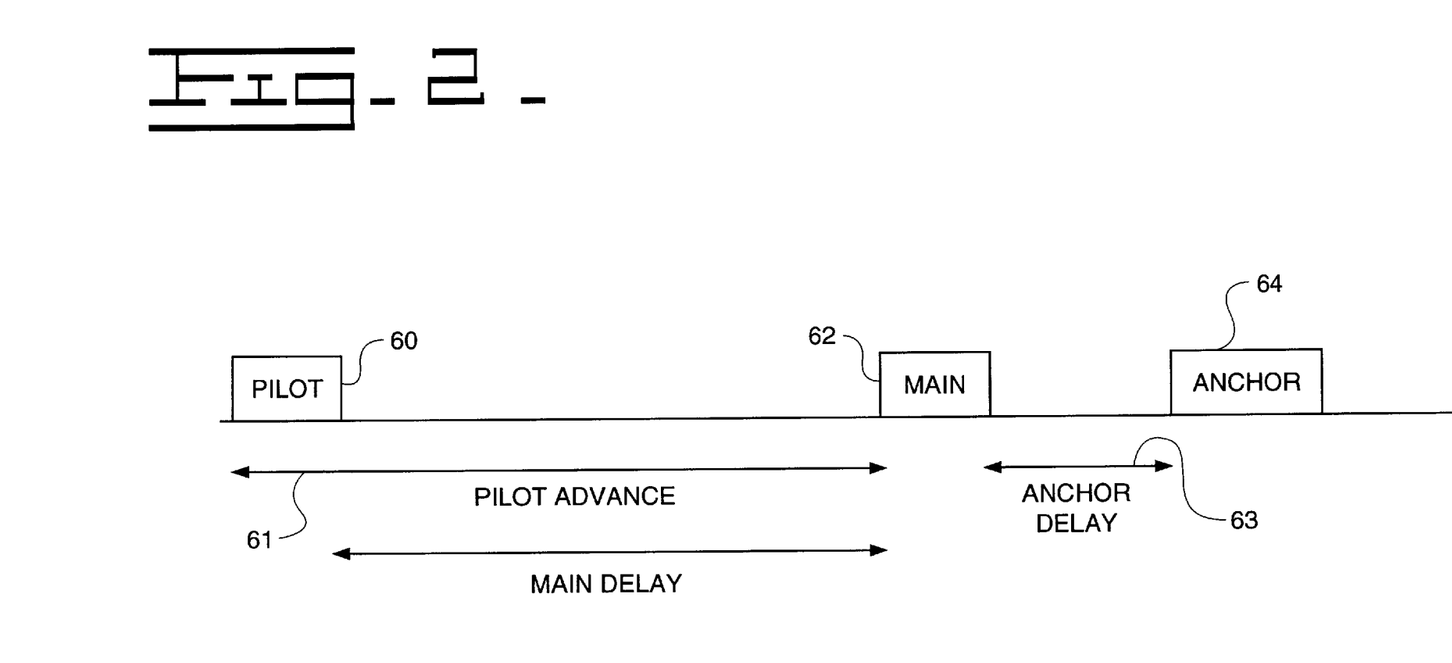
FIG. 2 is a schematic profile of a three shot fuel injection event.

It is recognized that the type of fuel injection desired during any particular fuel injection event will typically vary depending upon various engine operating conditions at the time. In an effort to achieve desired emissions, it has been found that delivering multiple fuel injections to a particular cylinder during a fuel injection event at certain engine operating conditions achieves both desired engine operation as well as emissions control. FIG. 2 illustrates a multiple injection including three separate fuel injections, namely, a first fuel injection or pilot shot 60, a second fuel injection or main shot 62, and a third fuel injection or anchor shot 64. As illustrated in FIG. 2, the pilot shot 60 is injected into the combustion chamber in advance of the main shot 62 by some predetermined time factor, crank angle or main delay 61, and the anchor shot is sequenced after the main shot 62 based upon a predetermined time factor, crank angle or anchor delay 63. Based upon programming associated with electronic controller 56 as well as a variety of different maps and/or lookup tables stored within the memory of controller 56 including maps and/or tables relating to engine speed, engine load, the pressure associated with rail passage 38 (rail pressure), desired total fuel quantity and other parameters, controller 56 will be able to dynamically determine the appropriate number of fuel shots, the quantity of fuel required for each fuel shot (e.g., pilot shot 60, main shot 62 and anchor shot 64) and partition the same accordingly, and it will be able to determine the timing and duration of each individual shot as well as the delay between the shots, such as the anchor delay 63. In the three shot multiple injection depicted in FIG. 2, a portion of the total fuel to be delivered to the combustion chamber will be injected as the pilot shot 60, a portion of such total fuel will be injected as the main shot 62, and the remaining portion of the total fuel to be injected will be injected as the anchor shot 64 A multiple shot fuel injection including three fuel shots has provided advantages in terms of exhaust emissions, including reduced particulate emissions and/or reduced $NO_x$ emissions as well as desired engine performance.

Figure 3:
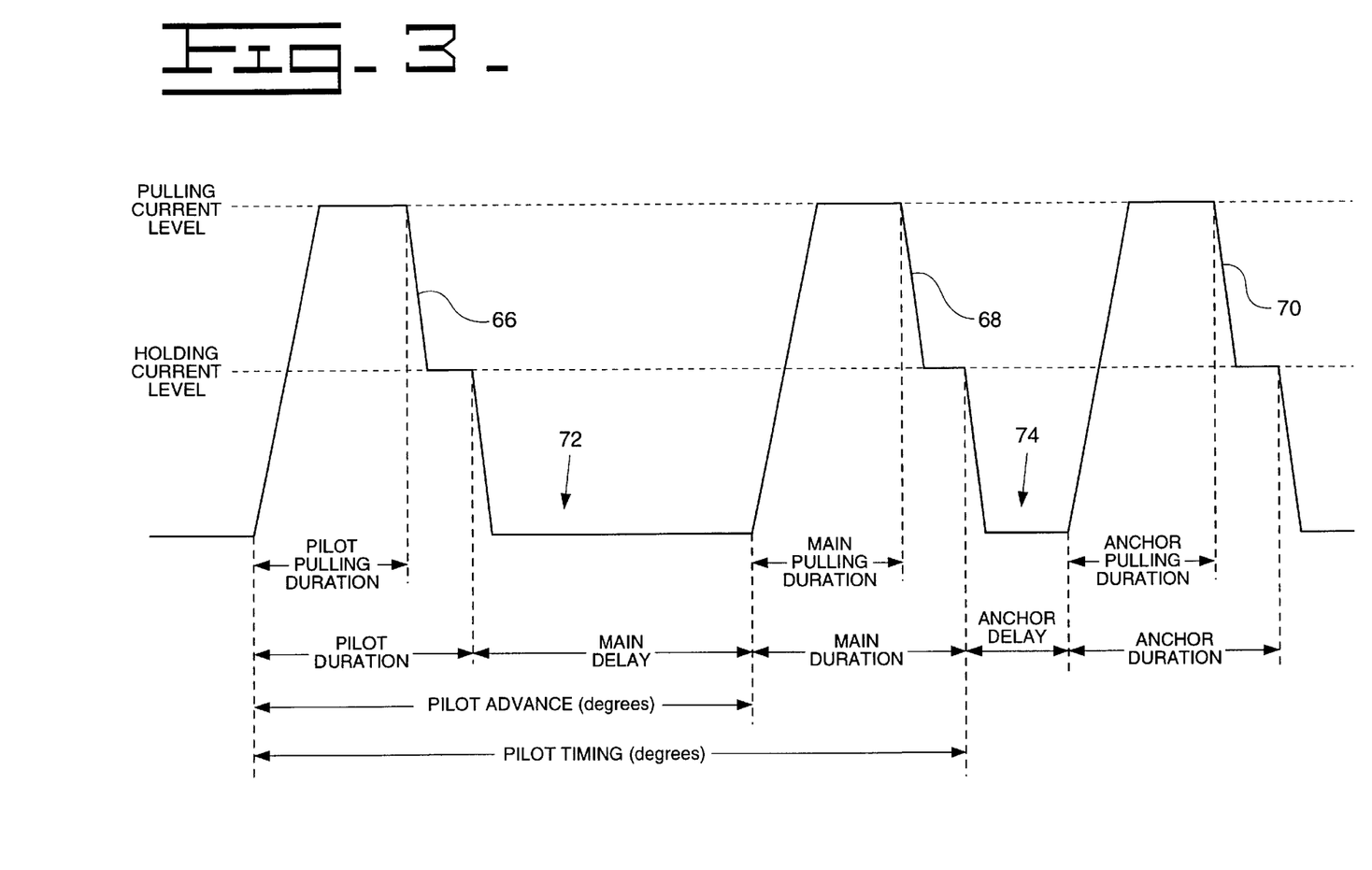
FIG. 3 is a schematic diagram of an exemplary current waveform for a three shot injection event.

An exemplary current waveform for a three shot injection event is illustrated in FIG. 3 showing a first or pilot shot control signal 66, a second or main shot control signal 68, a third or anchor shot control signal 70, a main delay signal 72 between the pilot and main shots, and an anchor delay signal 74 between the main and anchor shots. The duration of each of the control signals 66, 68 and 70 can be varied by ECM 56, and the duration of delays 72 and 74 can likewise be controlled by ECM 56. In a preferred embodiment, the timing and duration of the pilot, if there is one, and main shots are determined and set by ECM 56 and the timing and duration of the anchor shot is thereafter determined based upon the main shot timing, engine speed and engine load. In this regard, the start of the pilot shot will typically be determined based upon known parameters such as the main shot timing and pilot advance and the anchor shot timing will be just a time delay based upon termination of the main shot. Other methods for determining the various parameters associated with the three fuel injection shots are likewise recognized and anticipated.

FIG. 3 also illustrates the pull-in and hold in current levels associated with a typical hydraulically actuated electronically controlled fuel injector. When using hydraulically actuated electronically controlled fuel injectors, the injection signal includes generally a two-tier form that includes a pull-in current level and a generally lower hold-in current level. The pull-in current also has an associated duration that is determined by the ECM 56. The higher pull-in current is used to quickly open the fuel injector and thereby decrease the response time, that is, the time between the initiation of a fuel injection signal and the time in which fuel actually begins to enter the engine cylinder. Once fuel injection has commenced, a lower level hold-in current can be used to hold the injector open for the remainder of the injection event. The pilot, main and anchor pull-in durations are likewise illustrated in the representative current waveform depicted in FIG. 3. Based upon engine operating conditions, the type of fuel and fuel injectors being utilized, and other parameters, it is recognized and anticipated that the waveform illustrated in FIG. 3 may be modified and altered accordingly.

Figure 4:
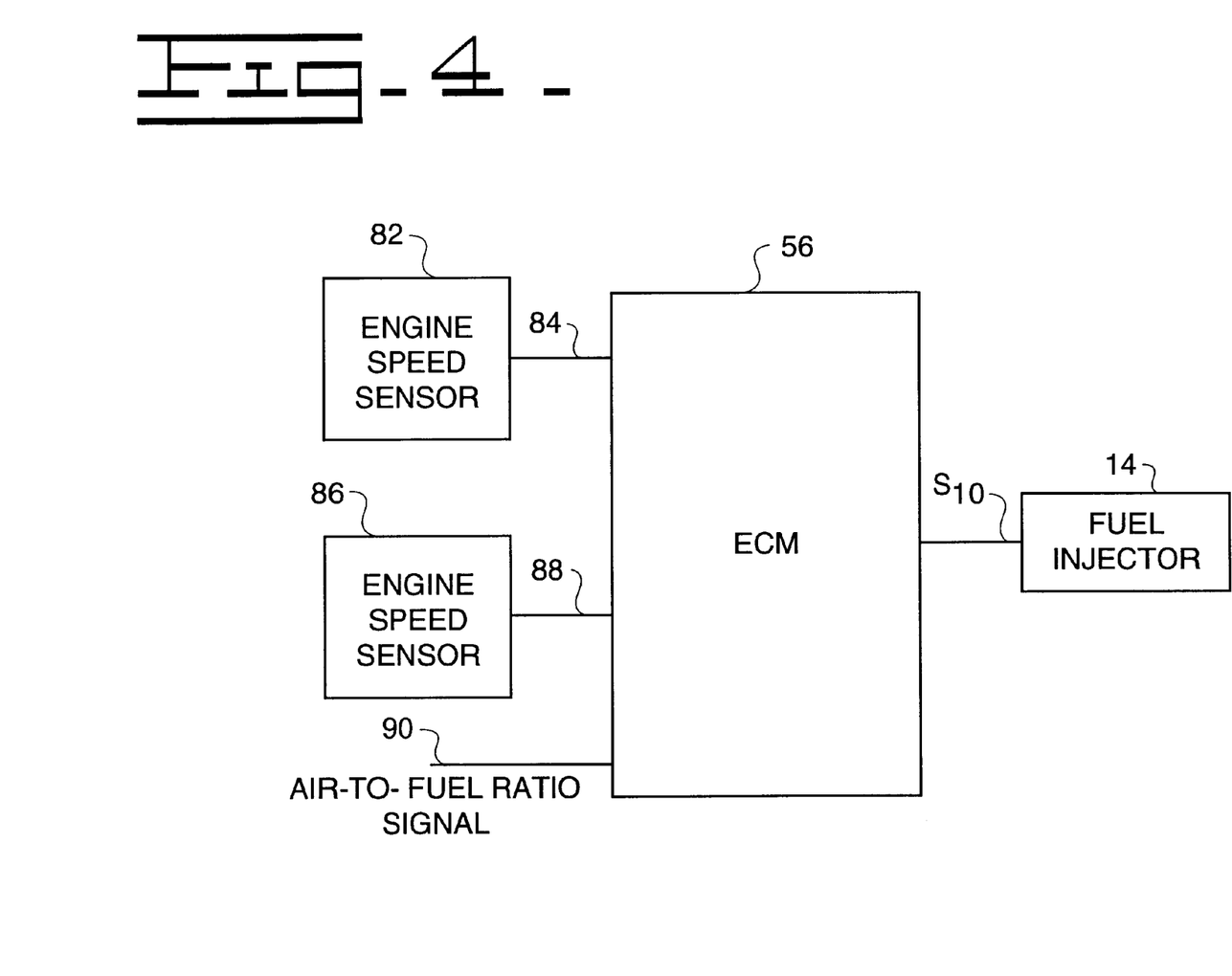
FIG. 4 is a graphical illustration of one embodiment of an electronic control system constructed in accordance with the teachings of the present invention.
Figure 5:
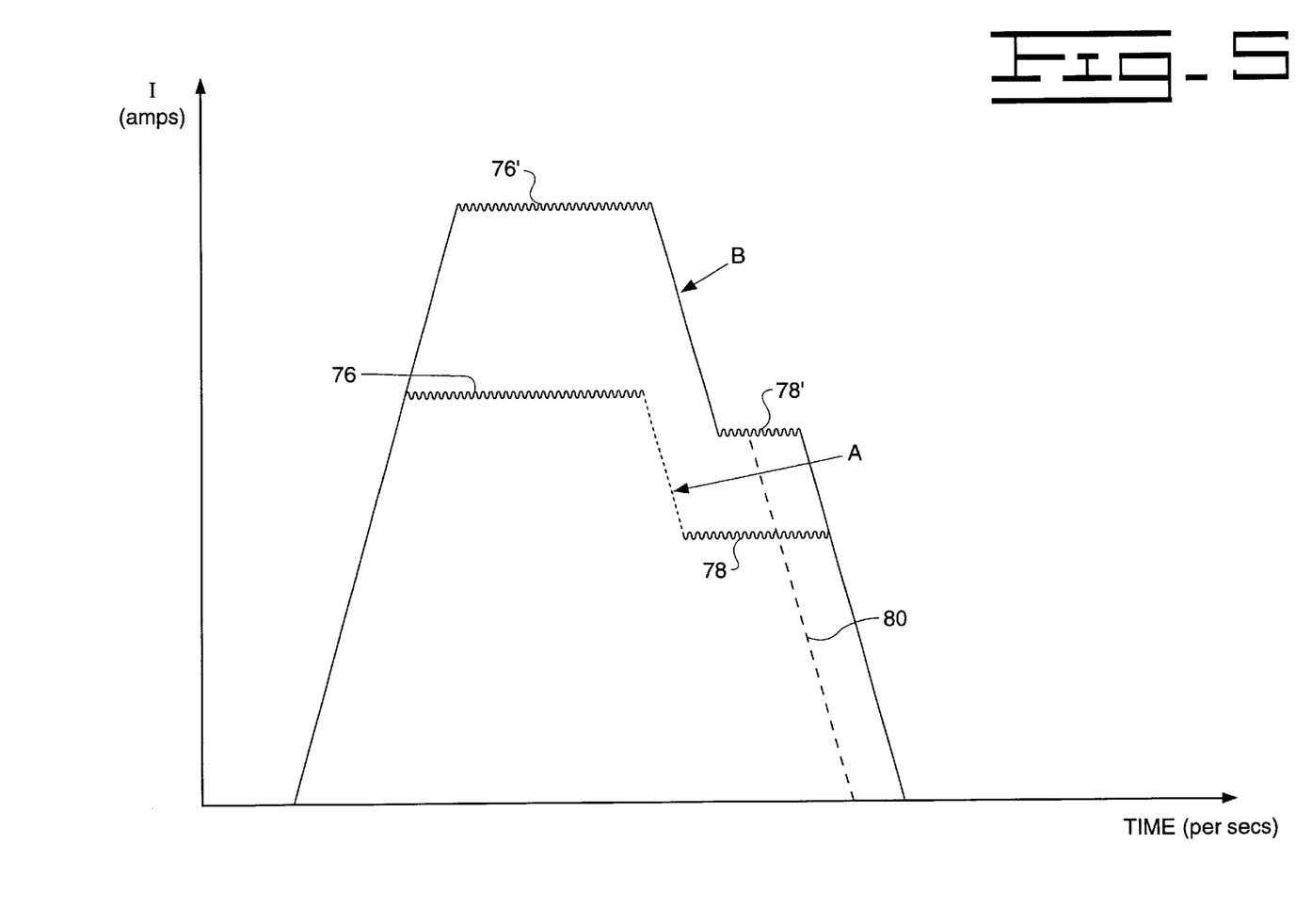
FIG. 5 is a graphical illustration showing the relationship between the electrical current level of a fuel injection signal versus the time duration under normal engine speed condition, and under sudden engine acceleration condition in accordance with the teachings of the present invention.

FIG. 4 illustrates one embodiment of a control system constructed in accordance with the teachings of the present invention provided to generate fuel injection signals $S_{10}$ to the fuel injectors 14. FIG. 5 illustrates an exemplary comparison of one of the fuel shots of a single or multiple injection event such as any one of the pilot shot 60, main shot 62 and anchor shot 64 delivered under normal engine speed operating conditions (graph A in FIG. 5) with the same fuel shot delivered under a sudden acceleration condition in accordance with the present control system illustrated in FIG. 4 (graph B in FIG. 5). Waveforms A and B in FIG. 5 include a pull-in current level 76 and a hold-in current level 78, each current level being maintained individually for a specific period of time as represented by the x-axis illustrated in FIG. 5. As explained above, those skilled in the art will appreciate that the pull-in current level is typically greater than the hold-in current level, and an increase in the current for either level of the signal will result in a greater amount of electrical power being associated therewith. The electrical power associated with each current level will be delivered to the respective fuel injector solenoid or other electrical actuating device by electrical control means 20. Due to the mechanical construction and operation of a typical hydraulically activated electronically controlled fuel injector, it can be appreciated that the opening and holding open of the fuel injector valves will be opposed by the rail pressure in manifold 36 (FIG. 1) which is controlled by ECM 56 via signal $S_9$. It will be further appreciated that a higher rail pressure will typically force fuel into the respective engine cylinder at a greater rate during the time that the valve is open.

During sudden, or rapid, engine acceleration such as when an operator of a vehicle suddenly pushes upon the accelerator pedal or other throttle mechanism associated with the engine, the engine attempts to increase speed relatively quickly in accordance with the requested increase in fuel quantity. To minimize emissions, rail pressure is increased above normal levels as well. Assuming that the pull-in current level and pull-in current duration controlled by electronic control means 20 or ECM 56 under sudden acceleration conditions remains the same as the pull-in current level and duration provided under normal engine speed conditions, the fuel injector valve may not open fully or quick enough to achieve the requested and desired fuel injection to meet the acceleration requirements, and the injector valve may not stay open fully for the required or necessary duration to meet the acceleration requirements due to the higher rail pressure (injection pressure) desired during the acceleration. Such operation, however, is contrary to what is desirable in a sudden acceleration event.

In order to ensure that the injector valve will open and remain open as desired during sudden acceleration events, in accordance with the teachings of the present invention, the amount of power or current level delivered to the fuel injector may be increased for a short predetermined period of time to meet the acceleration demand requested by the operator. For example, the pull-in current level, pull-in current duration, and/or hold-in current level may be increased The increase in either the pull-in and/or the hold-in current levels, is depicted by graph B in FIG. 5. As shown, pull-in current level 76' and hold-in current level 78' are higher than those delivered under normal engine speed conditions, but the duration of the fuel shot signal remains the same. The higher current levels will improve the responsiveness and performance of the fuel injection valve, particularly during a high rail pressure or acceleration event and as a result, the valve is more likely to open faster and stay open as desired. Therefore, under periods of acceleration, the pull-in current level and/or hold-in current level may be increased to achieve a faster response from the injector to obtain the desired injection results. The pull-in current duration may also be increase to enable the fuel injector to provide a longer pull-in current level, which will help open the fuel injector valve quicker. Depending upon the particular acceleration event, it may be necessary to increase only the pull-in current level, the pull-in current duration, or only the hold in current, or combinations of them, as will be further discussed. The pull-in current duration may be increased without increasing the overall duration of the shot.

In one embodiment, during a period of acceleration, the rail pressure of the actuating fluid to the injector would likely be increased to support the overall performance of the system. Therefore, without modification to the pull-in current level or pull-in current duration, an increase in fuel would be delivered. However, during periods of acceleration, the governor is inherently requesting additional fuel be delivered. Therefore, the total injection (pull-in and hold-in) current duration may be increased to provide the addition fuel requested by the governor. Therefore, in one embodiment, the pull-in current duration may be modified to supply the necessary initial sustained force in the injector solenoid to allow the injector to consistently deliver the requested fuel. Therefore, in one embodiment, the duration of the pull-in current pulse may be extended from the nominal value during the engine acceleration event. The increase pull-in current duration may be performed when the rail pressure is increased during the acceleration event. Increasing the rail pressure beyond nominal values when an acceleration event was not occurring may cause degradation in injector repeatability while the system remains at the acceleration rail pressure levels. Increasing the pull-in current duration instead of the pull-in current may be desirable for at least two reasons. First, depending on the electronic hardware implementation, the hardware may be limited in the level of current that can be supplied to an injector at any given time. Current levels beyond a certain level may be considered over current levels that may trip short circuit diagnostics to protect the electronics from damage. Therefore, as an alternative to increasing the pull-in current level, the pull-in current duration may be increased. Second, the injector solenoid may be close to magnetic flux saturation so that under some conditions, large increases in pull-in current level may only produce a small increase in force output from the injector solenoid. The force out of the injector solenoid is what initiates and maintains the physical injection event. In either of these cases, extending the pull-in current duration rather than the pull-in current level may produce the consistent injector behavior that is desired even through engine acceleration events. As discussed above, varying combinations of modifying the pull-in current level, pull-in current duration, hold-in current, and rail pressure, may be utilized to provide the desired injector responsiveness during periods of high, or sudden, acceleration.

In the preferred embodiment, ECM 56 detects a sudden engine acceleration such that the fuel injection signal may be controlled accordingly to achieve the desired injector current waveform necessary to maintain the desired injector performance during the sudden acceleration event. This may be accomplished in a variety of ways, and any one or a combination thereof may be utilized therefor. In one embodiment, a signal generating means such as an engine speed sensor 82 is coupled to ECM 56 and is operable to output a signal 84 thereto indicative of the speed of the engine. Based upon input signal 84, ECM 56 is operable to determine the rate of change of the engine speed over time. If the rate of change of the engine speed exceeds a predetermined threshold value, for example in the range of about 1,000 rpm to about 2,000 rpm per second, ECM 56 will determine that this rate of speed change is a sudden acceleration event, and will therefore control the fuel injection signals accordingly. That is, the engine speed may be sensed. An engine acceleration may be determined in response to the engine speed. The engine acceleration is compared to an acceleration threshold. If the engine acceleration exceeds the acceleration threshold, then the fuel injection signals are controlled accordingly. For example, the injection signals may be modified, such as increasing the pull-in current level, increasing the pull-in current duration, and/or increasing the hold-in current level to modify the fuel injector response in order to achieve the desired injection.

In another embodiment, a boost pressure sensor 86 is coupled to ECM 56 and is operable to output a signal 88 indicative of a condition which can be correlated to the speed and/or acceleration of the engine. Those skilled in the art will appreciate that during a sudden engine acceleration, a turbo-charger device must spin faster to compress and supply more air to the engine for the combustion of a greater amount of fuel being delivered to the engine and it takes time for the turbo-charger device to spin up. As a result, the air intake pressure, or boost pressure, will drop during a sudden acceleration event. Boost pressure sensor 86 can accordingly sense the boost pressure of the air being compressed and supplied by the turbo-charger device to the engine and output a signal 88 indicative thereof. Based upon the boost pressure signal 88, ECM 56 will correlate via maps, tables and other known means a change in boost pressure to a sudden acceleration event if the boost pressure changes by a predetermined threshold value or rate of change. Based upon this programmed correlation, ECM 56 will output the appropriate signal $S_{10}$ to control the fuel injection signals accordingly.

In still another embodiment, ECM 56 is operable to receive a signal 90 indicative of the air-to-fuel ratio of the fuel mixture being delivered to the cylinders of the engine. During a sudden acceleration event, the air-to-fuel ratio will decrease due to an increase in the amount of fuel delivered to the cylinders of the engine. ECM 56 will thus determine a sudden acceleration event when the air-to-fuel ratio decreases below a predetermined threshold value, and ECM 56 may thereupon control the fuel injection signals $S_{10}$ to the injectors 14 accordingly.

In an alternative embodiment, an increase in the pull-in current level, pull-in current duration and hold-in current levels will require a greater output of electrical power from ECM 56. Depending upon the increased current level and duration thereof, an increased electrical load on ECM 56 or electronic control means 20 may be detrimental to the life and performance of ECM 56 or electronic control means 20, including the various electrical and electronic components thereof, since such increase in power may cause thermal damage to the associated circuitry due to the increased amount of heat typically associated with higher current levels passing through such components. In one embodiment, in order to compensate for this increased amount of electrical power, under certain circumstances, the duration of the fuel injection signal during sudden acceleration may be decreased if the required amount of fuel can still be delivered in the reduced time period due to the higher rail pressure requested during the acceleration. For example, the pull-in current duration may be reduced, while maintaining the total duration of the combined pull-in and hold-in duration. However, despite any modifications in rail pressure that are either inherent in system performance during periods of acceleration, or that may be implemented to potentially address the increased power useage, the overall duration of the combined pull-in current duration and hold-in current duration are likely to be increased to support the increased fuel request from the governor.

INDUSTRIAL APPLICABILITY

As described herein, the present apparatus and method has particular utility in all types of engines, such as engines utilized in vehicles, work machines, marine vessels, electrical generators, stationary engines, and the like. The present apparatus and method, therefore, provides a control system and method for controlling the various current levels or current durations (e.g., pull-in current duration) associated with a fuel injection signal, including a single or a multiple fuel shot injection signal, without requiring the circuitry, system or apparatus responsible for delivering the fuel injection signals to be redesigned or reengineered to perform at higher current levels or to handle undesirably high power loads.

It is recognized and anticipated that the engine performance threshold values, the time periods of performance monitoring by electronic control means 20, and the like, may be pre-programmed into electronic control means 20, or such values may be available in maps or tables stored in a memory means or data storage means associated with electronic control means 20. Alternatively, such values may be determined by appropriate formulas or mathematical computations to be performed by ECM 56 in a continuing loop or at fixed time intervals. In this regard, appropriate fuel maps relating rail pressure, engine speed, engine load, pilot/main/anchor duration times, pilot/main/anchor fuel quantities, anchor timing delays, pilot/main timing, and other parameters can be stored or otherwise programmed into ECM 56 for use during all operating conditions of the engine. These operational maps, tables and/or mathematical equations stored in the programmable memory determine and control the various parameters associated with the appropriate multiple injection events to achieve desired engine performance. Accordingly, it is recognized and anticipated that electronic control means 20 may perform such steps in any one of the various ways known therefor in the art.

It is also recognized and anticipated that ECM 56 may determine or recognize a sudden or rapid acceleration event and increase the current levels or pull-in durations of the fuel injection signals based upon just one of the various inputs thereto, or it may do so based upon a combination of such inputs, possibly even giving different weight to the different input values. Further, it is recognized and anticipated that the action taken by electronic control means 20 may be any one or a combination of the various actions that it is capable of taking, such as increasing the pull-in current level or duration, and/or increasing the hold-in current level, and/or shortening the overall duration of the fuel injection shot.

It is recognized and anticipated that ECM 56 will preferably increase the pull-in and/or hold-in current levels and pull-in current duration for the duration of the acceleration event, or for a predetermined time period, and thereafter return to a normal current level so that the overall power/heat dissipation requirements will not significantly change or otherwise cause thermal damage to the circuitry. In this regard, the fuel injection signals may be returned to normal, such as graph A depicted in FIG. 5, either gradually over a number of fuel injection events, or more abruptly in a single fuel injection event, or until another predetermined criteria is satisfied. It is also recognized that the fuel injection signal may include one current level for the entire duration of the signal.

Those skilled in the art will also appreciate that even though higher current levels are delivered to the injector during a sudden acceleration event, the total amount of electrical power delivered thereto does not necessarily increase by the same proportion. The decreased amount of power due to a shortened shot duration helps offset the additional amount of electrical power required for the increased current at least to some extent.

Those skilled in the art will further appreciate that the present invention does not include the drawbacks of a purely hardware enhancement, such as a boost circuit, to achieve the objectives hereof. Instead, the use of a controller and software provides an improved, more dependable, and more economical embodiment or implementation for achieving the various objectives of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

Other aspects, objects and advantages of the present invention can be obtained from a study of the drawings, the disclosure and the appended claims.

What is claimed is:

1. A control system for controlling a fuel injection signal to an electronically controlled fuel injector during a sudden acceleration event of an engine comprising:

an electronic controller coupled to the fuel injector, said controller being operable to output a fuel injection signal to the fuel injector and to control at least one of a current level and a current duration of said fuel injection signal;

at least one signal providing mechanism coupled to said controller for inputting a signal thereto indicative of an acceleration of the engine, said controller being operable to recognize an acceleration event of the engine based upon said input signal;

said controller being further operable to increase at least one of a current level and a current duration of at least a portion of said fuel injection signal when a sudden acceleration event is recognized;

wherein said fuel injection signal includes a pull-in current level and a pull-in current duration and a hold-in current level, said controller being operable to increase at least one of said pull-in current level, said pull-in current duration, and said hold-in current level when a sudden acceleration event is recognized.

2. The control system as set forth in claim 1 wherein said input signal is indicative of boost pressure associated with the engine, said controller being operable to recognize a sudden acceleration event when said change in the boost pressure exceeds a predetermined threshold value.

3. The control system as set forth in claim 2 wherein said signal providing mechanism is a boost pressure sensor operable to sense the boost pressure associated with the engine.

4. The control system as set forth in claim 1 wherein an actuating fluid pressure in the engine is increased during said acceleration event.

5. A control system for controlling a fuel injection signal to an electronically controlled fuel injector during a sudden acceleration event of an engine comprising:

an electronic controller coupled to the fuel injector, said controller being operable to output a fuel injection signal to the fuel injector and to control at least one of a current level and a current duration of said fuel injection signal;

at least one signal providing mechanism coupled to said controller for inputting a signal thereto indicative of an acceleration of the engine, said controller being operable to recognize an acceleration event of the engine based upon said input signal;

said controller being further operable to increase at least one of a current level and a current duration of at least a portion of said fuel injection signal when a sudden acceleration event is recognized;

wherein said fuel injection signal includes a pull-in current level, a pull-in current duration, and a hold-in current level, said controller being operable to increase each of said pull-in current level, pull-in current duration, and said hold-in current level when a sudden acceleration event is recognized.

6. A control system for controlling a fuel injection signal to an electronically controlled fuel injector during a sudden acceleration event of an engine comprising:

an electronic controller coupled to the fuel injector, said controller being operable to output a fuel injection signal to the fuel injector and to control at least one of a current level and a current duration of said fuel injection signal;

at least one signal providing mechanism coupled to said controller for inputting a signal thereto indicative of an acceleration of the engine, said controller being operable to recognize an acceleration event of the engine based upon said input signal;

said controller being further operable to increase at least one of a current level and a current duration of at least a portion of said fuel injection signal when a sudden acceleration event is recognized;

wherein said input signal is indicative of an air-to-fuel ratio being supplied to the engine, said controller being operable to increase the current level of at least a portion of said fuel injection signal when said air-to-fuel ratio exceeds a predetermined threshold value.

7. A control system for controlling a fuel injection signal to an electronically controlled fuel injector during a sudden acceleration event of an engine comprising:

an electronic controller coupled to the fuel injector, said controller being operable to output a fuel injection signal to the fuel injector and to control at least one of a current level and a current duration of said fuel injection signal;

at least one signal providing mechanism coupled to said controller for inputting a signal thereto indicative of an acceleration of the engine, said controller being operable to recognize an acceleration event of the engine based upon said input signal;

said controller being further operable to increase at least one of a current level and a current duration of at least a portion of said fuel injection signal when a sudden acceleration event is recognized;

wherein said fuel injection signal includes at least one fuel shot, said at least one fuel shot having a predetermined duration associated therewith, said controller being further operable to decrease the duration of said at least one fuel shot when a sudden acceleration event is recognized.

8. A control system for controlling a fuel injection signal to an electronically controlled fuel injector during a sudden acceleration event of an engine comprising:

an electronic controller coupled to the fuel injector, said controller being operable to output a fuel injection signal to the fuel injector and to control at least one of a current level and a current duration of said fuel injection signal;

at least one signal providing mechanism coupled to said controller for inputting a signal thereto indicative of an acceleration of the engine, said controller being operable to recognize an acceleration event of the engine based upon said input signal;

said controller being further operable to increase at least one of a current level and a current duration of at least a portion of said fuel injection signal when a sudden acceleration event is recognized;

a plurality of signal providing mechanisms coupled to said controller for inputting a plurality of signals thereto indicative of conditions which are correlatable to an acceleration of the engine, and said controller being operable to recognize a sudden acceleration event based upon one of said plurality of input signals; and wherein said electronic controller is operable to recognize a sudden acceleration event based upon a predetermined combination of said plurality of input signals.

9. A control system for controlling a fuel injection signal to an electronically controlled fuel injector during a sudden acceleration event of an engine comprising:
- an electronic controller coupled to the fuel injector, said controller being operable to output a fuel injection signal to the fuel injector and to control at least one of a current level and a current duration of said fuel injection signal;
- at least one signal providing mechanism coupled to said controller for inputting a signal thereto indicative of an acceleration of the engine,
- said controller being operable to recognize an acceleration event of the engine based upon said input signal;
- said controller being further operable to increase at least one of a current level and a current duration of at least a portion of said fuel injection signal when a sudden acceleration event is recognized;
- wherein said fuel injection signal includes a plurality of fuel shots, each fuel shot including a pull-in current level, a pull-in current duration, and a hold-in current level, said controller being operable to increase at least one of said pull-in current level and said hold-in current level associated with at least one of said plurality of fuel shots when a sudden acceleration event is recognized.

10. A method for controlling at least one of the current level and current duration of a fuel injection signal, for an electronically controlled fuel injector during a sudden acceleration event of an engine, wherein said fuel injection signal comprises a pull-in current level, a pull-in current duration and a hold-in current level, the method comprising the steps of:
- (a) sensing a condition indicative of an acceleration of the engine;
- (b) establishing a threshold value for said sensed condition;
- (c) comparing said sensed condition with said threshold value therefor;
- (d) recognizing a sudden acceleration event if said sensed condition exceeds said predetermined threshold value;
- (e) increasing at least one of the current level and current duration of at least a portion of said fuel injection signal when a sudden acceleration event is recognized; and
- (f) increasing at least one of said pull-in current level, said pull-in current duration, and said hold-in current level when a sudden acceleration event is recognized.

11. The method as set forth in claim 10 wherein said sensed condition is the air intake boost pressure associated with the engine.

12. The method as set forth in claim 10 wherein said sensed condition is the air-to-fuel ratio of a fuel and air mixture being delivered to the engine.

13. A method for controlling at least one of the current level and current duration of a fuel injection signal for an electronically controlled fuel injector during a sudden acceleration event of an engine, wherein said fuel injection signal includes at least one fuel shot, said at least one fuel shot having a duration associated therewith, the method comprising the steps of:
- (a) sensing a condition indicative of an acceleration of the engine;
- (b) establishing a threshold value for said sensed condition;
- (c) comparing said sensed condition with said threshold value therefor;
- (d) recognizing a sudden acceleration event if said sensed condition exceeds said predetermined threshold value;
- (e) increasing at least one of the current level and current duration of at least a portion of said fuel injection signal when a sudden acceleration event is recognized; and
- (f) decreasing the duration of said at least one fuel shot when a sudden acceleration event is recognized.

14. A method for controlling at least one of the current level and current duration of a fuel injection signal for an electronically controlled fuel injector during a sudden acceleration event of an engine, the method comprising the steps of:
- (a) sensing a condition indicative of an acceleration of the engine;
- (b) establishing a threshold value for said sensed condition;
- (c) comparing said sensed condition with said threshold value therefor;
- (d) recognizing a sudden acceleration event if said sensed condition exceeds said predetermined threshold value;
- (e) increasing at least one of the current level and current duration of at least a portion of said fuel injection signal when a sudden acceleration event is recognized; and
- (f) sensing a plurality of conditions indicative of an acceleration of the engine;
- (g) establishing a predetermined threshold value for a predetermined combination of said plurality of sensed conditions; and
- (h) recognizing a sudden acceleration event when said predetermined combination of said plurality of sensed conditions exceeds the established predetermined threshold value.

15. A method for determining a fuel injection signal for an electronically controlled fuel injector, the fuel injector being in electronic communication with an electronic controller, wherein said fuel injection signal comprises a pull-in current level, a pull-in current duration and a hold-in current level, comprising the steps of:
- sensing a condition indicative of an acceleration of the engine;
- establishing an acceleration of said engine in response to said sensed condition;
- comparing said engine acceleration with a threshold acceleration;
- modifying at least one of a current level and a current duration of at least a portion of said fuel injection signal when said engine acceleration is greater than said acceleration threshold; and
- increasing at least one of said pull-in current level, said pull-in current duration, and said hold-in current level when said engine acceleration is greater than said acceleration threshold.

16. The method as set forth in claim 15 wherein said fuel injection signal includes at least one fuel shot, said at least one fuel shot having a duration associated therewith, said method further including the step of:
- decreasing the duration of said pull-in current duration when said engine acceleration exceeds said threshold acceleration.

17. The method as set forth in claim 15 wherein said sensed condition is the speed of the engine.

18. The method as set forth in claim 15 wherein said sensed condition is the air intake boost pressure associated with the engine.

19. The method as set forth in claim 15 wherein said sensed condition is the air-to-fuel ratio of a fuel and air mixture being delivered to the engine.

20. A method for determining a fuel injection signal for an electronically controlled fuel injector, the fuel injector being in electronic communication with an electronic controller, wherein said fuel injection signal comprises a pull-in current level, a pull-in current duration and a hold-in current level, comprising the steps of:

sensing a condition indicative of an acceleration of the engine;

establishing an acceleration of said engine in response to said sensed condition;

comparing said engine acceleration with a threshold acceleration;

modifying at least one of a current level and a current duration of at least a portion of said fuel injection signal when said engine acceleration is greater than said acceleration threshold; and increasing at least one of said pull-in current level, and said hold-in current level when said engine acceleration is greater than said acceleration threshold.

21. A method, as set forth in claim 20, further comprising the step of reducing at least one of said pull-in current duration and a hold-in current duration in response to said increased at least one of said pull-in current level and said hold-in current level.

22. A control system for controlling a fuel injection signal to an electronically controlled fuel injector during a sudden acceleration event of an engine comprising:

an electronic controller coupled to the fuel injector, said controller being operable to output a fuel injection signal to the fuel injector and to control at least a current level of said fuel injection signal;

at least one signal providing mechanism coupled to said controller for inputting a signal thereto indicative of an acceleration of the engine, said controller being operable to recognize an acceleration event of the engine based upon said input signal;

said controller being further operable to increase at least a current level of at least a portion of said fuel injection signal when a sudden acceleration event is recognized.

23. The control system as set forth in claim 22 wherein said input signal is indicative of boost pressure associated with the engine, said controller being operable to recognize a sudden acceleration event when said change in the boost pressure exceeds a predetermined threshold value.

* * * * *